United States Patent
Camus

(10) Patent No.: US 7,486,803 B2
(45) Date of Patent: Feb. 3, 2009

(54) METHOD AND APPARATUS FOR OBJECT TRACKING PRIOR TO IMMINENT COLLISION DETECTION

(75) Inventor: Theodore Armand Camus, Marlton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 966 days.

(21) Appl. No.: 11/013,087

(22) Filed: Dec. 15, 2004

(65) Prior Publication Data

US 2005/0131646 A1 Jun. 16, 2005

Related U.S. Application Data

(60) Provisional application No. 60/529,481, filed on Dec. 15, 2003.

(51) Int. Cl.
*G06K 9/00* (2006.01)
(52) U.S. Cl. .................................... 382/104
(58) Field of Classification Search ............... 382/100, 382/103, 106–107, 153–154, 224, 227; 348/148, 348/171, 149, 135, 140, 142–143, 150, 169, 348/159, 47–48, 113–119; 340/435–438, 340/903, 937, 928; 701/23, 28, 117, 200, 701/300, 301, 96
See application file for complete search history.

(56) References Cited

U.S. PATENT DOCUMENTS

| 6,157,765 | A | 12/2000 | Bruce et al. | |
|---|---|---|---|---|
| 6,661,449 | B1 * | 12/2003 | Sogawa | 348/113 |
| 6,836,357 | B2 | 12/2004 | Wang et al. | |
| 6,838,980 | B2 * | 1/2005 | Gloger et al. | 340/435 |
| 6,856,906 | B2 * | 2/2005 | Winner et al. | 701/301 |
| 2006/0095207 | A1 * | 5/2006 | Reid | 701/301 |

* cited by examiner

*Primary Examiner*—Sherali Ishrat

(74) *Attorney, Agent, or Firm*—Lowenstein Sandler PC

(57) ABSTRACT

A method and apparatus for performing collision detection is described. An object is detected within a first operational range of an object tracker. A classification of the object is determined using the object tracker. The object tracker tracks the object. The object is detected within a second operational range of a collision detector. A safety measure is activated based on the classification using the collision detector.

27 Claims, 3 Drawing Sheets

METHOD AND APPARATUS FOR OBJECT TRACKING PRIOR TO IMMINENT COLLISION DETECTION

CROSS-REFERENCE TO RELATED APPLICATIONS

This application claims benefit of U.S. provisional patent application Ser. No. 60/529,481, filed Dec. 15, 2003, which is herein incorporated by reference.

BACKGROUND OF THE INVENTION

1. Field of the Invention

Embodiments of the present invention generally relate to vision systems, e.g., as deployed on a vehicle. In particular, this invention relates to tracking objects and detecting imminent collisions using stereo vision.

2. Description of the Related Art

Significant interest exists in the automotive industry for systems that detect imminent collisions in time to avoid that collision or to mitigate its damage. Collision avoidance systems typically must detect the presence of potential threats, determine their speed and trajectory, and assess their collision threat. Prior art collision avoidance systems have used radar to determine the range and closing speed of potential threats. However, affordable radar systems usually lack the required spatial resolution to reliably and accurately determine the size and the location of potential threats.

Since stereo vision can provide the high spatial resolution required to identify potential threats, stereo vision has been used in collision detection and avoidance systems. However, present collision detecting and avoidance systems are not capable of determining a classification of an object that is in danger of imminent collision. Without knowing the classification of an object, an avoidance system is not capable of providing safety measures that depend on the type of object that is in imminent danger of collision.

Therefore, there is a need in the art for new techniques of using stereo vision for collision detection and avoidance.

SUMMARY OF THE INVENTION

The present invention generally relates to a method and apparatus for performing collision detection. In one embodiment, an object is detected within a first operational range of an object tracker. A classification of the object is determined using the object tracker. The object tracker tracks the object. The object is detected within a second operational range of a collision detector. A safety measure is activated based on the classification using the collision detector.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The principles of the present invention enhance object tracking and collision detection systems such that they explicitly communicate target characteristics, such as target type or classification, track targets over time, use the target classification information at shorter operational ranges, and take appropriate counter-measure action based on target classification to mitigate injury and damage. For example, some embodiments take counter-measures by deploying external airbags with radically different characteristics (such as airbag inflation speed and force) depending on the target classification (such as a pedestrian, or a vehicle such as a sedan or SUV), and on the time available for collision mitigation.

The principles of the present invention further provide for a collision detection system that detects objects proximate a vehicle. The system includes an optical sensor array comprised of stereo cameras that produce imagery that is processed to detect pedestrians. Such processing includes generating a plurality of disparity images at different resolutions. Those disparity images can be selectively used to produce depth maps (or depth image) of the scene proximate the vehicle by processing selected disparity images. The result is depth maps having different resolutions. The disparity images and/or the depth maps are processed and compared to pre-rendered templates of objects. A list of possible objects is subsequently produced by matching the pre-rendered templates to the disparity images and/or to the depth map. The system processes the possible object list to detect objects near the vehicle. For example, a pedestrian may be detected by eliminating very eccentric peaks in a correlation image while retaining all peaks with an inverse eccentricity above a predetermined value, e.g. >0.4. Inverse eccentricity is the ratio of the minor and major axes of an ellipse corresponding to all nearby high correlation scores for the detected peaks. This information can be used in a number of ways, e.g., the objects may be displayed to the driver, a warning may be given, or the information may be used in a collision avoidance system that adjusts the trajectory or other parameters of the vehicle to safely avoid the object or mitigate damage or injury.

Figure 1:
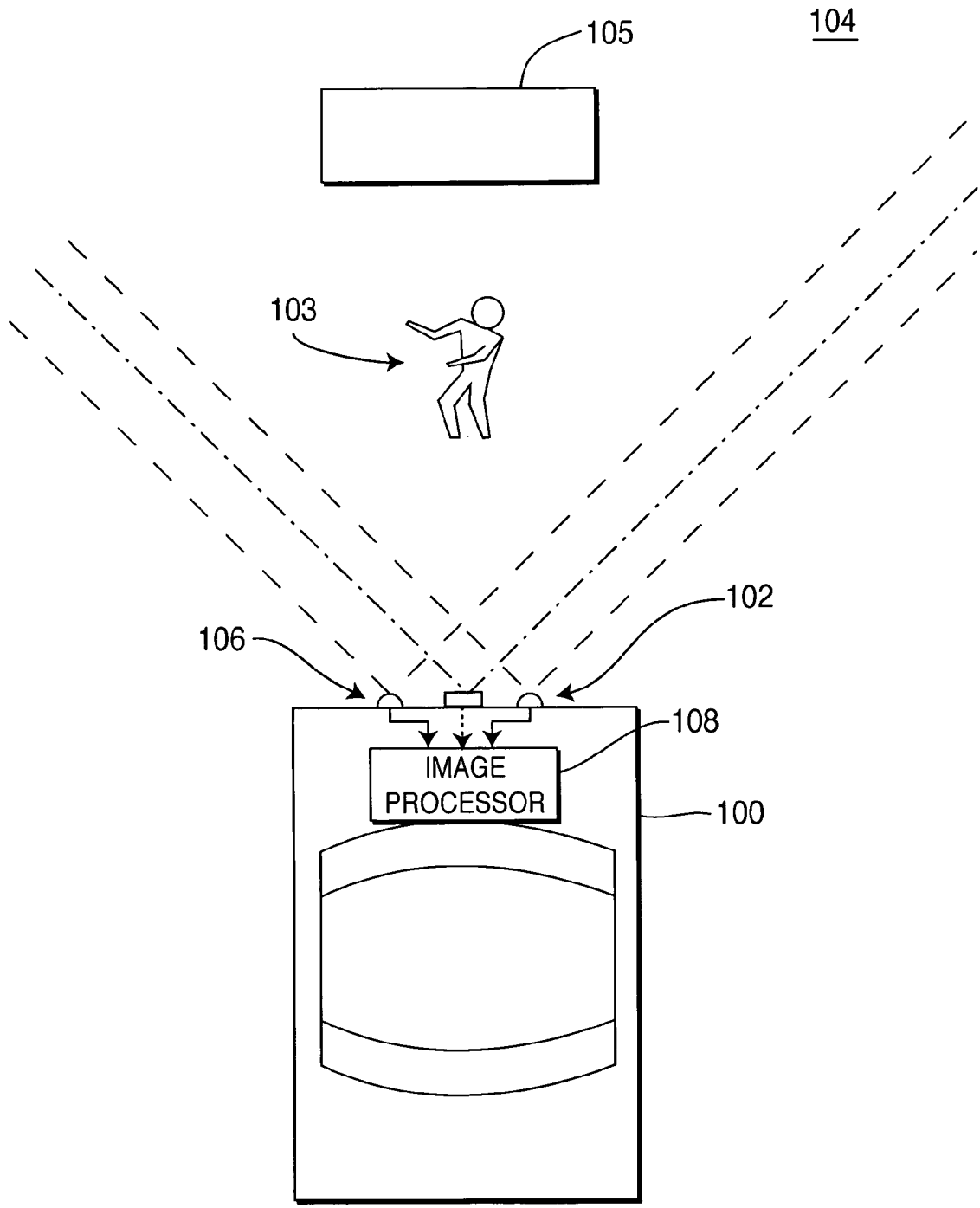
FIG. 1 depicts a schematic view of a vehicle utilizing the present invention.

FIG. 1 depicts a schematic diagram of a vehicle 100 having a collision avoidance system 102 that detects one or more objects (e.g., vehicles, pedestrians) 103, 105 within a scene 104 that is proximate the vehicle 100. While in the illustrated embodiment the scene 104 is in front of the vehicle 100, collision avoidance systems may image scenes that are behind or to the side of the vehicle 100. The collision avoidance system 102 comprises a sensor array 106 that is coupled to an image processor 108. The sensors within the sensor array 106 have a field of view that includes one or more objects 103, 105.

The field of view in a practical collision avoidance system 102 may be ±6 meters horizontally in front of the vehicle 100 (e.g., approximately 3 traffic lanes), with a ±3 meter vertical area, and have a view depth of approximately 12 meters. When the collision avoidance system 102 is part of a general collision avoidance system, the overall view depth may be 40 meters or so.

Figure 2:
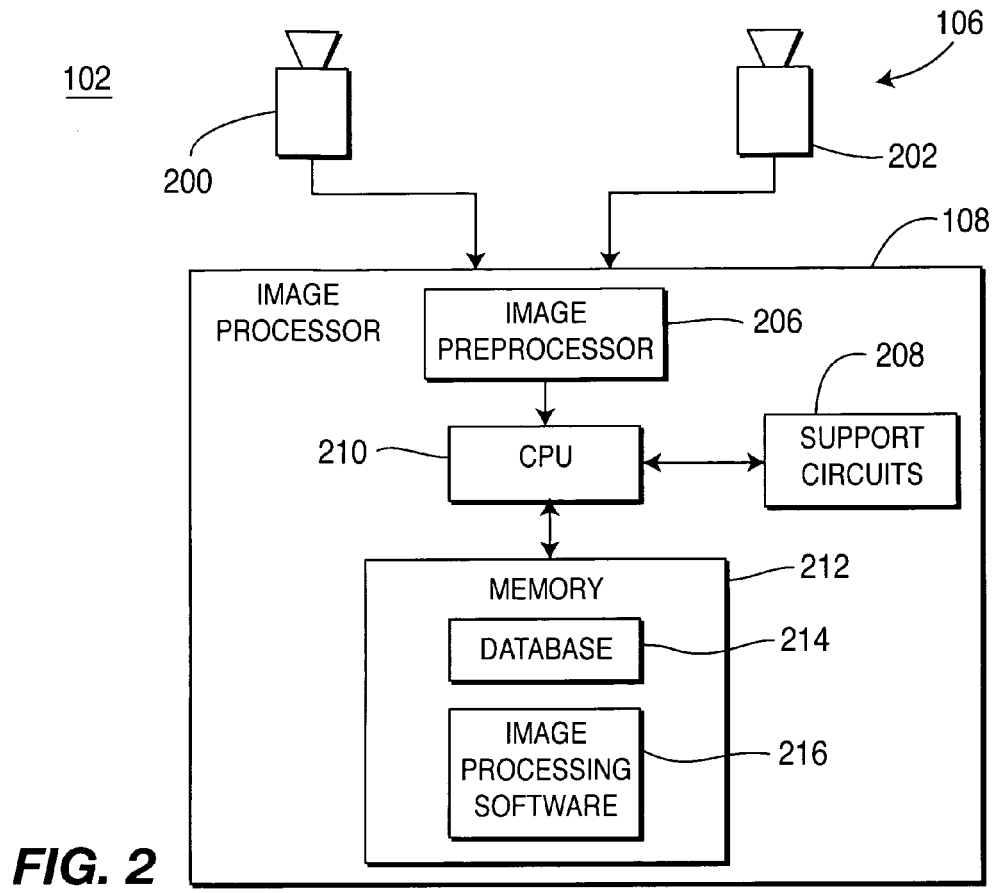
FIG. 2 depicts a block diagram of a vehicular vision system in accordance with the present invention.

FIG. 2 depicts a block diagram of hardware used to implement the collision avoidance system 102. The sensor array 106 comprises, for example, a pair of cameras 200 and 202. In some applications, an optional secondary sensor 204 can be included. The secondary sensor 204 may be radar, a LIDAR transceiver, an infrared range finder, a sonar range finder, and the like. The cameras 200 and 202 generally operate in the visible wavelengths, but may be augmented with infrared sensors, or the cameras may themselves operate in the infrared range. The cameras have a known, fixed relation to one another such that they can produce a stereo image of the scene 104. Therefore, the cameras 200 and 202 will sometimes be referred to herein as stereo cameras.

Still referring to FIG. 2, the image processor 108 comprises an image preprocessor 206, a central processing unit (CPU) 210, support circuits 208, and memory 212. The image preprocessor 206 generally comprises circuitry for capturing, digitizing and processing the imagery from the sensor array 106. The image preprocessor may be a single chip video processor.

The processed images from the image preprocessor 206 are coupled to the CPU 210. The CPU 210 may comprise any one of a number of presently available high speed microcontrollers or microprocessors. The CPU 210 is supported by support circuits 208 that are generally well known in the art. These circuits include cache, power supplies, clock circuits, input-output circuitry, and the like. The memory 212 is also coupled to the CPU 210. The memory 212 stores certain software routines that are executed by the CPU 210 to facilitate operation of the invention. The memory also stores certain databases 214 of information that are used by the invention, and image processing software 216 that is used to process the imagery from the sensor array 106. The memory may comprise one or more of random access memory, read only memory, disk drives, optical storage, tape storage, removable storage and the like. Although the invention is described in the context of a series of method steps, the method may be performed in hardware, software, or some combination of hardware and software. Additionally, the methods as disclosed can be stored on a computer readable medium such as memory 212.

Figure 3:
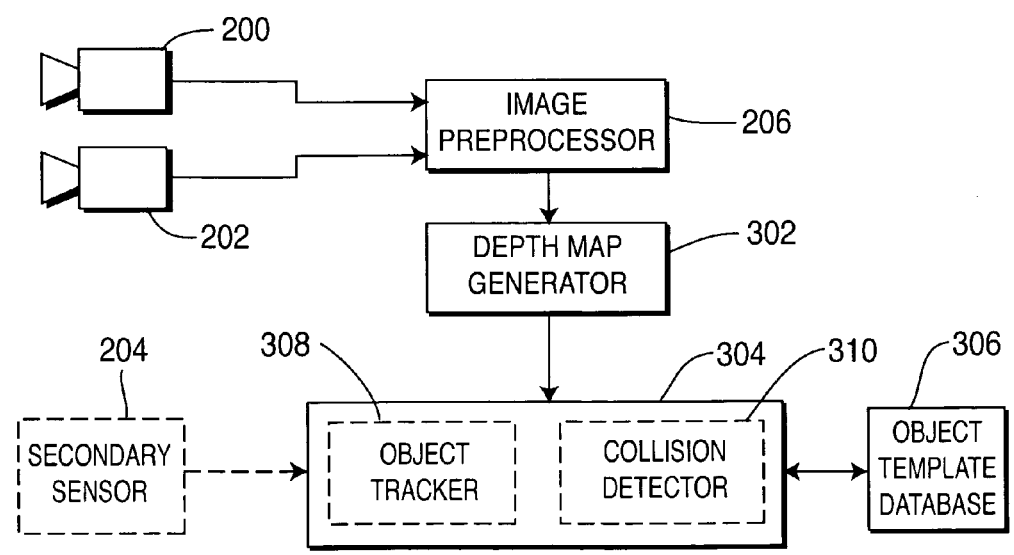
FIG. 3 is a depicts a block diagram of functional modules of the vision system of FIG. 2.

FIG. 3 is a functional block diagram of modules that are used to implement the present invention. The stereo cameras 200 and 202 provide stereo imagery to a stereo image preprocessor 206. The stereo image preprocessor is coupled to a depth map generator 302 which is coupled to an object processor 304. Object processor 304 also comprises object tracker 308 and collision detector 310. In some applications the depth map generator 302 is not used. However, the following will describe the functional block diagrams under the assumption that a depth map generator 302 is used. The object processor 304 receives information from an object template database 306 and from the optional secondary sensor 204. The stereo image preprocessor 206 calibrates the stereo cameras, captures and digitizes imagery, warps the images into alignment, performs pyramid wavelet decomposition, and performs stereo matching, to create disparity images at different resolutions.

For both hardware and practical reasons, creating disparity images having different resolutions is beneficial when detecting objects such as pedestrians. Calibration is important as it provides for a reference point and direction from which all distances and angles are determined. Each of the disparity images contains the point-wise motion from the left image to the right image and each corresponds to a different image resolution. The greater the computed disparity of an imaged object, the closer the object is to the sensor array.

The depth map generator 302 processes the disparity images into two-dimensional depth images. Each depth image (also referred to as a depth map) contains image points or pixels in a two dimensional array, wherein each point represents a specific distance from the reference point to a point within the scene 104. The depth images are then processed by the object processor 304 wherein templates (models) of objects are compared to the information within the depth image. In practice the depth map that is used for comparing with the object templates depends on the distance of the possible pedestrian from the reference point. At a given distance a depth map derived from disparity images at one resolution have been found superior when template matching than another depth map derived from disparity images at another resolution. The actually depth map resolution to use in a particular situation will depend on the particular parameters of the collision avoidance system 102, such as the type of cameras being used and their calibration. As described below, the object template database 306 comprises templates of objects located at various positions and depths with respect to the sensor array 106 and its calibration information.

An exhaustive search of the object template database may be performed to identify an object template that closely matches information in a selected depth map. The secondary sensor 204 may provide additional information regarding the position of an object, e.g., pedestrian 103 relative to the vehicle 100 such that the object template search process can be limited to templates of pedestrians at about the known position relative to the vehicle 100. If the secondary sensor 204 is radar, the secondary sensor can, for example, provide an estimate of both pedestrian position and distance. Furthermore, the secondary sensor 204 can be used to confirm the presence of a pedestrian. The object tracker 308 produces an object list that is then used to identify object size and classification estimates that enable object tracking of each pedestrian's position within the scene 104. That object information may then be used to warn the vehicle 100 driver and or with an automated system to avoid or mitigate damage and injury from object collisions.

Figure 4:
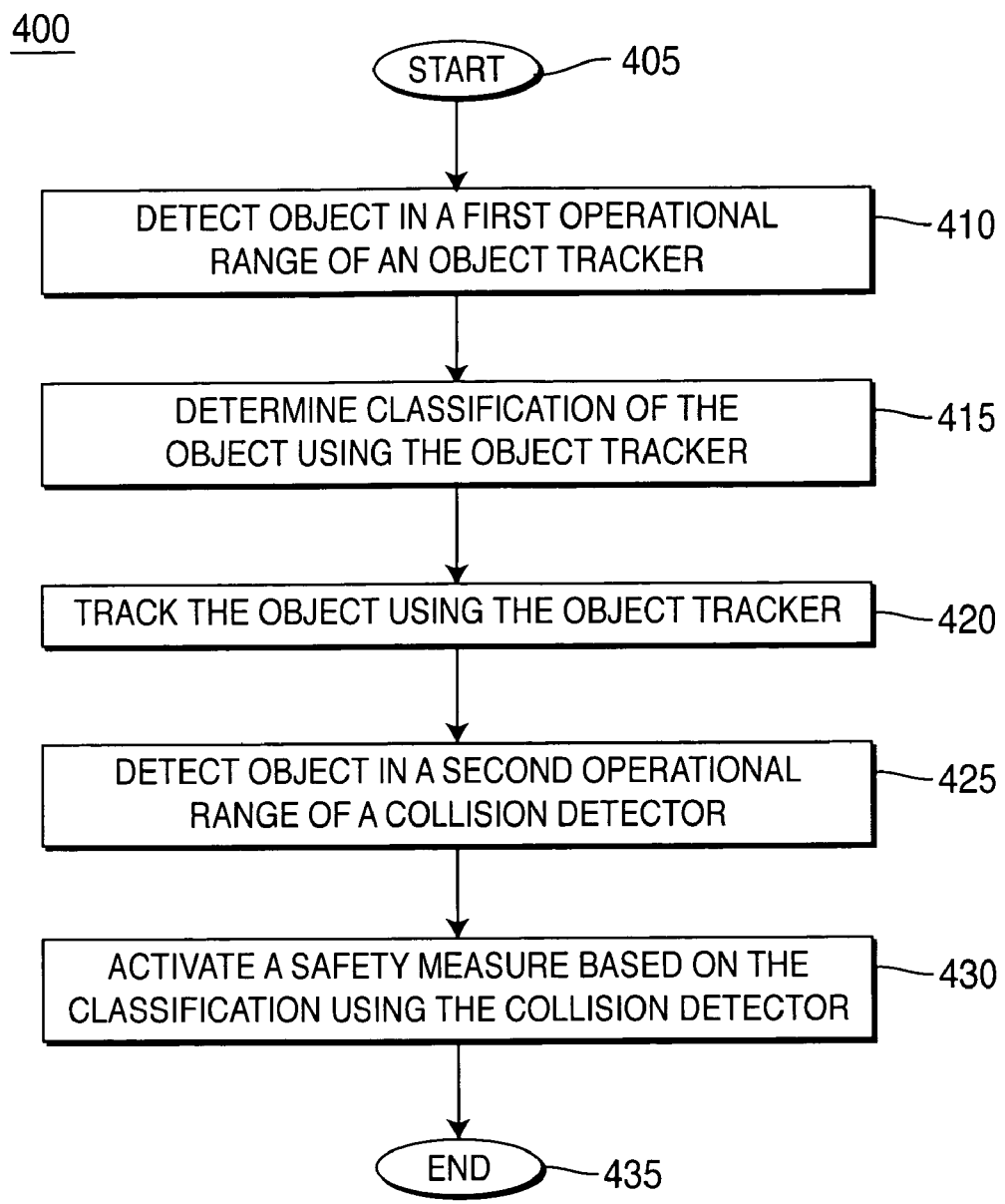
FIG. 4 depicts a flow diagram of the operation of a vision system in accordance with the present invention.

FIG. 4 depicts a flow diagram of a method 400 of operating the collision avoidance system 102. The method begins at step 405 and proceeds to step 410 where an object is detected in a first operational range of an object tracker. Setup and calibration is performed for stereo cameras 200, 202. This is typically done only once per configuration. Calibration is used to provide various parameters such as a vehicle reference position, reference camera heights, stereo camera separation, and other reference data for the steps that follow. Images from stereo cameras 200, 202 are captured and digitized. The imagery generated from each of the cameras is warped into alignment to facilitate producing disparity images. Warping is performed using the calibration parameters.

A plurality of disparity images from the stereo camera images is generated using pyramid wavelet decomposition. Each disparity image corresponds to a different image resolution. The disparity images are created for each pair of frames generated by the stereo cameras. The disparity image comprises, in addition to the disparity information, an indication of which of the disparity pixels in the image are deemed valid or invalid. Certain disparity values may be deemed invalid because of image contrast anomalies, lighting anomalies and other factors. This valid/invalid distinction is used in processing the depth image as described below.

The disparity images are used to produce a depth map. The depth map is produced using the calibration parameters and a selected disparity map produced with a desired resolution. As previously noted, when detecting objects at a given distance from the vehicle, a depth map derived from a disparity image at one resolution will work better than a depth map derived from a disparity map having a different resolution. This is because of hardware limitations that limit depth map generation and because of mathematical conversions when forming depth maps from the disparity images that produce depth map artifacts that show up as "noise" using one disparity image resolution but not with another resolution. The transformation to a depth map is not required. It does however, simplify subsequent computations. The depth map (also known as a depth image or range image) comprises a two-dimensional array of pixels, where each pixel has a value indicating the depth within the image at that pixel to a point in the scene from the sensor. As such, pixels belonging to objects in the image will have a depth to the object and all other pixels will have a depth to the horizon or to the roadway in front of the vehicle.

To confirm that an object, such as a pedestrian, exists in the field of view of the stereo cameras, a secondary sensor signal may be used for target cueing. This step is optional and may not be required in some systems. If the secondary sensor 204 is radar, the secondary sensor produces an estimate of the range and position of an object. The purpose of this optional step is to restrict a subsequent depth map search so as to reduce the search space, and thus reduce the required calculations. Since the pedestrian template search will be restricted to areas at and near the radar-provided position and depth estimate, the pedestrian template matching process will require less time. This step assists in preventing false targets by avoiding unnecessary searches.

In step 415, a classification of the object is determined using the object tracker. An object template database is searched to match object templates to the depth map. The object template database comprises a plurality of pre-rendered object templates, e.g., depth models of various vehicles and pedestrians as they would typically be computed by the stereo depth map generator 302. The depth image is a two-dimensional digital image, where each pixel expresses the depth of a visible point in the scene 104 with respect to a known reference coordinate system. As such, the mapping between pixels and corresponding scene points is known. In one embodiment, the object template database is populated with multiple object depth models, one for each object class (e.g. vehicle and pedestrian) for each point in the scene, tessellated in a grid with ¼ meters by ¼ meters resolution.

A depth model based search is employed, where the search is defined by a set of possible object location pose pairs. For each such pair, the hypothesized object 3-D model is rendered and compared with the observed scene range image via a similarity metric. This process creates an image with dimensionality equal to that of the search space, where each axis represents and object model parameter such as but not limited to lateral or longitudinal distance, and each pixel value expresses a relative measure of the likelihood that an object exists in the scene 104 within the specific parameters. Generally, an exhaustive search is performed wherein an object template database is accessed and the object templates stored therein are matched to the depth map. However, if the optional target cueing is performed the search space can be restricted to areas at or near objects verified by the secondary sensor. This reduces the computational complexity of having to search the complete scene 104.

Matching itself can be performed by determining a difference between each of the pixels in the depth image and each similarly positioned pixels in the object template. If the difference at each pixel is less than a predefined amount, the pixel is deemed a match.

A match score is computed and assigned to corresponding pixels within an object-specific scores image where the value (score) is indicative of the probability that the pixel is indicative of the object (e.g., a vehicle or a pedestrian). Regions of high density (peaks) in the pedestrian scores image indicate a potential pedestrian 103 in scene 104. Regions of high density (peaks) in the vehicle scores image indicate a potential vehicle 105 in scene 104. Those regions (modes) are detected using a mean shift algorithm of appropriate scale. Each pixel is shifted to the centroid of its local neighborhood. This process is iterated until convergence for each pixel. All pixels converging to the same point are presumed to belong to the same mode, and modes that satisfy a minimum score and region of support criteria are then used to initialize the object detection hypotheses.

Object detection includes eliminating certain aspects of a particular object's scores image or by calculating certain properties of the depth map. For example, an object may be classified as a pedestrian by eliminating very eccentric peaks in a pedestrian scores image while retaining all peaks with an inverse eccentricity greater than some predetermined value, e.g., >0.4. Here, inverse eccentricity is the ratio of the minor and major axes of an ellipse that corresponds to a nearby high correlation score for the detected peak. The effect is to restrict pedestrian detection to objects having a top-down view of a pedestrian, which tend to be somewhat round. An object may be classified as a vehicle by computing its width and/or length, depending on what parts of the object are visible. For example, if the side of the object is visible and is measured, in the depth map, to be several meters long, then it is much more likely to be a vehicle than a pedestrian. Conversely, if only the rear of the object is visible, and has a width of over a meter then it is also much more likely to be a vehicle than a pedestrian.

The match scores can be derived in a number of ways. In one embodiment, the depth differences at each pixel between the template and the depth image are summed across the entire image and normalized by the total number of pixels in the object template. Without loss of generality, these summed depth differences may be inverted or negated to provide a measure of similarity. Spatial and/or temporal filtering of the match score values can be performed to produce new match scores.

As previously noted, the use of a depth map is not required. For example, the disparity image produced would not be converted into a depth map. The optional target cueing is performed in the same way the optional target cueing is performed when using a depth map. However the object templates are matched against the disparity image produced. Therefore, the object templates are based on disparity images rather than on depth maps. A match test is then performed to match the object templates to the multi-resolution disparity image.

In step 420, the object is tracked using object tracker 308. Once an object has been classified, the object may be further validated. Such further validation ensures that the detected object and its classification is more reliable and reduces the possibility of the occurrence of a false positive. A validation may be performed by stereo camera-based object detection system 102 or an optional secondary sensor, typically radar. If a secondary sensor is utilized, once a possible object is identified, the secondary sensor information is compared to the identified object to validate that the object 103, 105 is truly in the scene 104. In some systems validation by both the stereo camera-based object detection system 102 and by a secondary sensor may be required. Then, based on the foregoing, an object list is updated and the objects 103, 105 are tracked. In some systems, objects 103, 105 that do not track well can be eliminated as possible objects (being false positives). While tracking the objects, the original images from the stereo cameras may be used to identify the boundaries of objects 103, 105 within the scene 104. Further, each object is tracked across image frames such as by using a Kalman filter. Such tracking enables updating of the classification of the objects 103, 105 using multiple frames of information.

In step 425, an object is detected within an operational range of a collision detector 310. The stereo cameras 200 and 202 provide left and right image stream inputs that are processed to form a stereo depth map. In one embodiment, object tracker 308 and the collision detector 310 have the same field of view. Since object tracker 308 and the collision detector 310 have the same field of view, a depth map would only need to be produced once during any given time interval. With the stereo depth data available, a threat detection and segmentation algorithm detects objects in the stereo depth data, and thus in the scene 104 using collision detector 310. The threat detection and segmentation step returns "bounding boxes" of objects in the stereo depth data.

Once bounding boxes are obtained, the properties of the objects can be obtained from the stereo depth data. The size and height of the potential threats are determined. The relative position of the potential threats are determined. Then a velocity estimation algorithm is performed that provides velocity estimates for the potential threats. The details of determining those properties are described subsequently.

All of the foregoing properties (e.g., size, height, position, velocity) are estimates that are derived from the stereo depth data, which includes image noise. To reduce the impact of that noise, those property estimates are time filtered. More specifically, the position and velocity measurements are filtered using Kalman filters, and a low-pass filter filters noise from the other property estimates. After low pass filtering, the low pass filtered estimates are threshold detected. Threshold detection removes small objects from the potential threat list.

Once filtered size, position, and velocity estimates are known, the collision avoidance system 102 performs a trajectory analysis and a collision prediction of the potential threats. That analysis, combined with the threshold determination, is used to make a final decision as to whether an imminent collision with a potential threat is likely.

Both object tracker 308 and collision detector 310 use target lists. Target lists are a list of objects, each with its own computed characteristics. These computed characteristics may be one or more of the following: estimated size, estimated motion vector, range, range rate, estimated classification, location, size, orientation, edges (e.g., bounding box), estimated crash/collision point, class). Object tracker 308, if used alone, is useful for classification but does not accurately obtain collision vector information. Likewise, collision detector 310, if used alone, is useful for obtaining collision vector information but does not include reliable classification information.

In order to make a determination in collision detector 310 as to the type of object that is in danger of imminent collision with vehicle 100, the classification computed in step 415 is communicated to collision detector 310. In effect, the object being tracked by object tracker 308 is handed off to collision detector 310. This handoff allows for the association of a detected object between object tracker 308 and collision detector 310. The objects may be associated between the two systems by location, e.g., within a range. The objects may also be associated by matching additional information such as range rate, closing velocity, velocity vector and collision impact point, height, width and/or length, major-axis orientation, classification, edges and/or bounding box, image statistics such as image edge density or image contrast, or depth map statistics such as depth variation or depth map density.

In one embodiment, the communication of the classification data may occur at a pre-selected threshold point where the first operational range of object tracker 308 and the second operational range of collision detector 310 meet. In the case where there is a hard cut-off from object tracker 308 to collision detector 310, extrapolation of target list data, e.g., position vector, location vector, velocity vector, is performed.

In one embodiment, the classification may be communicated during an overlap period (e.g., a period where object tracker 308 and collision detector 310 are tracking the same object or objects) of the first operational range and the second operational range where there is no predefined cut-off for the first and second operational ranges. During the overlap period, false positive results may be avoided when in a cluttered environment by tracking the object(s) simultaneously using both object tracker 308 and collision detector 310.

In one embodiment, a switch from object tracker 308 to collision detector 310 is made only when object tracker 308 determines a classification of an object. In this embodiment, less computational resources are required since only one system is running at a given time.

There are certain instances where a decision regarding an imminent collision must be made with very little data, e.g., only one or two frames of depth map data. In one embodiment, collision detector 310 may be deployed only when a reliable classification has been made. In another embodiment, when there is very little data available, collision detector 310 may be deployed whether or not a reliable classification has been made.

In step 430, a safety measure based on the classification from step 415 is activated using collision detector 310. If a tracked object is determined to be in a position that could possibly involve a collision with the vehicle 100, object information is provided to the driver and an alarm, or avoidance or damage or injury mitigation mechanism is initiated. The avoidance or damage or injury mitigation mechanism thresholds are adjusted based on the classification of the object. Finally, the method 400 terminates at step 435.

In practice, some counter-measures used to mitigate damage or injury in an automotive collision may be non-reversible. For example, current airbag mechanisms trigger only when on-board accelerometers detect that a collision is in progress. This provides only a few tens of milliseconds to inflate the airbag, requiring a literally explosive bag inflation, which in some cases actually causes injury to the occupant it is intended to protect. Embodiments of the present invention provide for controlled counter-measures to mitigate damage and injury upon detection of an imminent collision. For example, embodiments provide for pre-inflation of an interior airbag without explosive inflation.

Embodiments of the present invention use a wide range of collision mitigation and/or counter-measures devices. In addition to pre-inflating an internal and/or external airbag, additional non-reversible counter-measures include inflatable external airbags on the front hood or grill, and actuated mechanical protective devices such as a protective fence in front of the grill. Alternate counter-measures may be reversible, such as actuating the host vehicle's brakes and/or releasing the accelerator, tightening the occupants' seatbelts, actuating a deformable elastic hood to prevent head impacts against the engine block, or even temporarily controlling the host vehicle's steering. While these counter-measures may be reversible, their sudden unexpected onset in a non-collision scenario (i.e., a false positive) may also create a shock to the driver such that an accident is caused. Thus while reversible countermeasures may not incur the cost of system re-arming, the consequences of false triggering may have drastic consequences and so there is a need for a highly reliable target detection and classification systems.

Object tracker 308 and collision detector 310 could operate simultaneously. However, simultaneous operation of both systems would increase the amount of required computational resources. In one embodiment, stereo depth map or disparity images are interleaved or time sliced (e.g., the stereo depth map or disparity image frames are alternated) such that object tracker 308 and collision detector 310 are operating simultaneously but are using less processing resources. In another embodiment object tracker 308 and collision detector 310 share the same computed stereo depth or disparity map, but each system's processing subsequent to depth map or disparity map generation is interleaved.

Although the foregoing has described one platform for object tracker 308 and collision detector 310 with the same field of view. One having skill in the art could also use two separate platforms for object tracker 308 and collision detector 310 having different fields of view. However, using two separate platforms would require more processing resources and would require more physical resources, which would increase cost considerably.

While the foregoing is directed to embodiments of the present invention, other and further embodiments of the invention may be devised without departing from the basic scope thereof, and the scope thereof is determined by the claims that follow.

The invention claimed is:

1. A method for performing collision detection, comprising:
   detecting an object within a first operational range of an object tracker;
   determining a classification of said object using said object tracker;
   tracking said object using said object tracker;
   detecting said object within a second operational range of a collision detector; and
   activating a safety measure based on said classification using said collision detector.

2. The method of claim 1, wherein the first operational range and the second operational range are mutually exclusive.

3. The method of claim 2, wherein said classification is communicated from said object tracker to said collision detector by extrapolating at least one of a positional vector, a location vector, and a velocity vector.

4. The method of claim 1, wherein the first operational range and the second operational range overlap.

5. The method of claim 1, wherein the object tracker and the collision detector operate simultaneously.

6. The method of claim 1, wherein said classification is communicated from said object tracker to said collision detector during an overlap period of said first operational range and said second operational range.

7. The method of claim 1, further comprising communicating said classification from said object tracker to said collision detector.

8. The method of claim 7, wherein said classification is communicated during an overlap period of said first operational range and said second operational range.

9. The method of claim 7, wherein said classification is communicated by matching additional information from said object tracker and said collision detector.

10. The method of claim 9, wherein said additional information comprises at least one of range rate, closing velocity, velocity vector and collision impact point, height, width and/or length, major-axis orientation, classification, edges and/or bounding box, image statistics such as image edge density or image contrast, or depth map statistics such as depth variation or depth map density.

11. The method of claim 1, wherein the collision detector becomes operational only when a reliable classification is made.

12. An apparatus for performing collision detection, comprising:
   means for detecting an object within a first operational range of an object tracker;
   means for determining a classification of said object using said object tracker;
   means for tracking said object using said object tracker;
   means for detecting said object within a second operational range of a collision detector; and
   means for activating a safety measure based on said classification using said collision detector.

13. The apparatus of claim 12, wherein the first operational range and the second operational range are mutually exclusive.

14. The apparatus of claim 13, wherein said classification is communicated from said object tracker to said collision detector by extrapolating at least one of a positional vector, a location vector, and a velocity vector.

15. The apparatus of claim 12, wherein the first operational range and the second operational range overlap.

16. The apparatus of claim 12, wherein the object tracker and the collision detector operate simultaneously.

17. The apparatus of claim 12, wherein said classification is communicated from said object tracker to said collision detector during an overlap period of said first operational range and said second operational range.

18. The apparatus of claim 12, further comprising communicating said classification from said object tracker to said collision detector.

19. The apparatus of claim 18, wherein said classification is communicated during an overlap period of said first operational range and said second operational range.

20. The apparatus of claim 18, wherein said classification is communicated by matching additional information from said object tracker and said collision detector.

21. The apparatus of claim 20, wherein said additional information comprises at least one of range rate, closing velocity, velocity vector and collision impact point, height, width and/or length, major-axis orientation, classification, edges and/or bounding box, image statistics such as image edge density or image contrast, or depth map statistics such as depth variation or depth map density.

22. The apparatus of claim 12, wherein the collision detector becomes operational only when a reliable classification is made.

23. The apparatus of claim 12, wherein said object tracker and said collision detector share processing resources.

24. The apparatus of claim 12, wherein said object tracker and said collision detector have a same field of view.

25. The apparatus of claim 12, wherein said object tracker and said collision detector have different fields of view.

26. The apparatus of claim 12, wherein said object tracker and said collision detector are standalone systems.

27. A computer-readable medium having stored thereon a plurality of instructions, the plurality of instructions including instructions which, when executed by a processor, cause the processor to perform the steps of a method for performing collision detection, comprising:

detecting an object within a first operational range of an object tracker;

determining a classification of said object using said object tracker;

tracking said object using said object tracker;

detecting said object within a second operational range of a collision detector; and activating a safety measure based on said classification using said collision detector.

* * * * *